(12) United States Patent
Wild et al.

(10) Patent No.: US 10,596,906 B2
(45) Date of Patent: Mar. 24, 2020

(54) FINGER STRIP AND USE OF SAID FINGER STRIP

(71) Applicant: VOLKSWAGEN AG, Wolfsburg (DE)

(72) Inventors: Holger Wild, Berlin (DE); Nils Kötter, Braunschweig (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/538,519

(22) PCT Filed: Dec. 16, 2015

(86) PCT No.: PCT/EP2015/080008
§ 371 (c)(1),
(2) Date: Jun. 21, 2017

(87) PCT Pub. No.: WO2016/102268
PCT Pub. Date: Jun. 30, 2016

(65) Prior Publication Data
US 2017/0368938 A1 Dec. 28, 2017

(30) Foreign Application Priority Data

Dec. 22, 2014 (DE) .......................... 10 2014 226 760
Jan. 2, 2015 (DE) .......................... 10 2015 200 007

(51) Int. Cl.
*G06F 1/16* (2006.01)
*B60K 35/00* (2006.01)
(Continued)

(52) U.S. Cl.
CPC .............. *B60K 35/00* (2013.01); *B60K 37/06* (2013.01); *G06F 3/017* (2013.01);
(Continued)

(58) Field of Classification Search
CPC ............................... G06F 3/0412; G06F 3/016
(Continued)

(56) References Cited

U.S. PATENT DOCUMENTS 8,640,045 B2 * 1/2014 Ording ................ G06F 3/04842
715/765
2009/0176469 A1 * 7/2009 Nagara ................... B60R 11/02
455/186.1
(Continued)

FOREIGN PATENT DOCUMENTS

| CN | 105045460 A | 11/2015 |
|---|---|---|
| DE | 10312812 A1 | 10/2004 |

(Continued)

OTHER PUBLICATIONS

PCT International Search Report and Written Opinion completed by the ISA/EP dated Mar. 8, 2016 and issued in connection with PCT/EP2015/080008.
(Continued)

*Primary Examiner* — Calvin C Ma
(74) *Attorney, Agent, or Firm* — Barnes & Thornburg LLP

(57) ABSTRACT

The present disclosure relates to an infotainment system, to a locomotion vehicle, and to a user interface. The user interface may comprise: an input device for detecting swipe gestures of a user guided by a structure in respect of two dimensions, called "finger strip" in the following, a display device, and an evaluating unit. The evaluating unit may be configured to evaluate swipe gestures detected by means of the finger strip for substantially continuously variable adjustment to an output variable and to evaluate tap inputs detected by means of the finger strip for selection and/or definition of favorites.

20 Claims, 14 Drawing Sheets

(51) Int. Cl.
*G06F 3/01* (2006.01)
*G06F 3/0354* (2013.01)
*G06F 3/0482* (2013.01)
*G06F 3/0481* (2013.01)
*G06F 3/0484* (2013.01)
*G06F 3/0488* (2013.01)
*B60K 37/06* (2006.01)

(52) U.S. Cl.
CPC ........ *G06F 3/03547* (2013.01); *G06F 3/0482* (2013.01); *G06F 3/04817* (2013.01); *G06F 3/04847* (2013.01); *G06F 3/04883* (2013.01); *B60K 2370/11* (2019.05); *B60K 2370/113* (2019.05); *B60K 2370/115* (2019.05); *B60K 2370/122* (2019.05); *B60K 2370/141* (2019.05); *B60K 2370/145* (2019.05); *B60K 2370/146* (2019.05); *B60K 2370/1438* (2019.05); *B60K 2370/1446* (2019.05); *B60K 2370/1468* (2019.05); *G06F 2203/0339* (2013.01)

(58) Field of Classification Search
USPC .................................. 345/156, 157, 173, 174
See application file for complete search history.

(56) References Cited

U.S. PATENT DOCUMENTS

| | | | | |
|---|---|---|---|---|
| 2012/0105312 A1* | 5/2012 | Helmes | ................... | G06F 3/016 345/156 |
| 2013/0146297 A1 | 6/2013 | Ellison | | |
| 2013/0169560 A1 | 7/2013 | Cederlund et al. | | |
| 2014/0365928 A1 | 12/2014 | Boelter et al. | | |
| 2015/0042588 A1* | 2/2015 | Park | ...................... | G06F 3/0412 345/173 |

FOREIGN PATENT DOCUMENTS

| | | |
|---|---|---|
| DE | 102006040572 A1 | 3/2008 |
| DE | 102008023505 A1 | 11/2009 |
| DE | 102008046764 A1 | 3/2010 |
| DE | 102008048825 A | 3/2010 |
| DE | 102011086859 A1 | 5/2013 |
| DE | 102012008681 A1 | 10/2013 |
| DE | 102012022312 A1 | 5/2014 |
| DE | 102013000110 A1 | 7/2014 |
| DE | 102011116175 A1 | 3/2015 |
| EP | 1895392 A1 | 3/2008 |
| KR | 20020060140 A | 7/2002 |
| KR | 20110076921 A | 7/2011 |
| KR | 20140105027 A | 8/2014 |
| WO | 20120034615 A1 | 3/2012 |
| WO | 2013074866 A1 | 5/2013 |

OTHER PUBLICATIONS

Office Action for European Patent Application No. 15828491.9, dated Nov. 7, 2018.
Office Action for Korean Patent Application No. 10-2017-7017602, dated Jun. 19, 2018.
Final Rejection for Korean Patent Application No. 10-2017-7017602 dated Nov. 19, 2018.
Office Action for Chinese Patent Application No. 201580069940.9, dated Jul. 4, 2019.

* cited by examiner

FINGER STRIP AND USE OF SAID FINGER STRIP

CROSS-REFERENCE TO RELATED APPLICATIONS

This application is a national stage entry under 35 USC § 371 of PCT International Application No. PCT/EP2015/080008, filed Dec. 16, 2015, and claims the benefit under 35 USC § 119(e) to German Patent Application Numbers 102014226760.9 and 102015200007.9, filed Dec. 22, 2014 and Jan. 2, 2015 (respectively).

SUMMARY

The present invention relates, in a first aspect ("finger strip") to an infotainment system, a transportation means and an apparatus for operating an infotainment system of a transportation means and, in a second aspect ("use of the finger strip"), to a transportation means and a user interface for handling favorites by means of a finger strip.

BRIEF DESCRIPTION OF THE DRAWINGS

Exemplary embodiments of the disclosure are described in detail below with reference to the accompanying drawings, in which.

DETAILED DESCRIPTION OF THE DISCLOSED EMBODIMENTS

Figure 1:
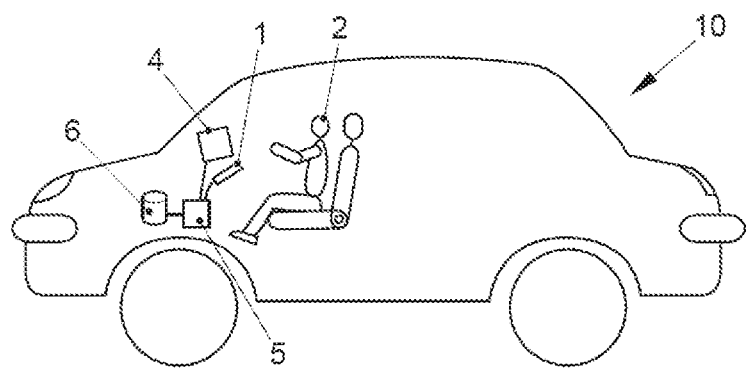
FIG. 1 shows a schematic overview of components of an exemplary embodiment of a transportation means according to the present disclosure having an exemplary embodiment of an apparatus.

The present disclosure relates to a transportation means, an infotainment system and an apparatus for operating an infotainment system of a transportation means. In particular, the present disclosure relates to a possibility for inputting infinitely variable input values by means of swiping gestures without the user having to look at the user interface in order to make specific inputs.

An object of the present disclosure is to integrate a convenient input device for swiping gestures in an optically advantageous manner in the interior of a transportation means. Another object of the present disclosure is to make feedback for a user of such a system intuitively comprehensible.

The object identified above is achieved, according to the disclosure, by means of an apparatus for operating an infotainment system of a transportation means, sometimes called a transportation vehicle. The apparatus comprises a linear or curved finger strip which is set up to haptically (longitudinally) guide a user's finger. In other words, a one-dimensional track is predefined for the user's finger. Such a track has, in particular, a concave and/or convex (partial) structure transverse to its longitudinal direction, which structure can be haptically detected by a user during a swiping gesture and can be used to orientate the finger on the finger strip. A detection unit for detecting swiping gestures carried out on the finger strip is also provided. The detection unit may detect (for example capacitively) a movement of human tissue on the finger strip and can convert it into electrical signals. An evaluation unit is provided for the purpose of processing detected swiping gestures (or signals produced by the latter) and can be in the form of a programmable processor, a microcontroller, a nanocontroller or the like. The apparatus also has a linear light outlet which extends at least approximately completely along the finger strip. The light outlet may be a partially transparent plastic and/or glass body and/or sintered body through which a luminous means behind it can distribute light in the direction of the user. In response to a user gesture detected by means of the detection unit, the apparatus according to the present disclosure can acknowledge the user gesture by means of a light signal emitted from the light outlet. For example, a function which has been started can be acknowledged by means of a light pattern associated with the function. The light pattern may also have one or more colors which are uniquely associated with the function which has respectively been started. Irrespective of a successful start of a function associated with the gesture, the actuation of the apparatus can also be acknowledged by outputting a corresponding light signal. In the case of a swiping gesture in particular, a shimmer (also "glow" or "corona") can be produced around the finger(s) and moves with the finger, as a result of which the user is informed of the manner in which the apparatus has detected his gesture. A user gesture can also already be understood as meaning an approach or placement of one or more fingers, one or more running lights being produced along the light outlet (for example starting at its edge(s)) in the direction of the finger(s), with the result that even untrained users are provided with an intuitively comprehensible signal indicating that they have just found or used an input interface.

The finger strip may be provided for horizontal arrangement, for example. This may provide the advantage that a ledge or a support for a finger is formed in the vertical direction, as a result of which accelerations produced in the vertical direction (for example when driving over a bump or a pothole) do not move the user's finger from an intended area in front of the finger strip. The operation of the apparatus becomes particularly intuitive if the finger strip is arranged above and/or below a display area in a transportation means. In this manner, the apparatus or the finger strip provided according to the present disclosure is in a strong context of the display areas and is intuitively understood as part of a user interface. Particularly pleasant and self-explanatory haptics result if the finger strip is in the form of a channel-shaped or trough-shaped longitudinal groove which follows a surface of a (flat or curved) screen, for example.

The light outlet is preferably embedded in the finger strip, as a result of which the emitted light signal is particularly strongly associated with the user gesture. In other words, the light outlet is also brushed during operation according to the present disclosure of the finger strip, with the result that the acknowledging light signal appears to be arranged in the immediate vicinity, and in particular, also below the user's respective finger.

A suitable possibility for realizing the acknowledging light signals is to arrange a light source behind the light outlet, which light source comprises individual luminous means (for example light-emitting diodes, LEDs) which have a particularly fast response speed with respect to electrical signals controlling them. This enables a particularly precise output of light signals acknowledging the user gesture. In particular, a translucent (also colloquially "milky") element for homogenizing light distributed by the light outlet may be provided. In this manner, the translucent element ensures that the irradiated light is diffused in the direction of the user, as a result of which the inhomogeneous light source appears in an optically more attractive form and precise positioning of the light signal is nevertheless possible.

The variety of possible inputs becomes particularly clear to the user if the finger strip is bounded on both sides by optically and/or haptically delimited end regions in order to form key fields. For example, webs may be provided transverse to the longitudinal extent of the finger strip and can be clearly felt by the user. Additionally or alternatively, it is possible to provide grooves transverse to the longitudinal direction of the finger strip in order to optically and haptically delimit a swiping region between the end regions with respect to the key fields. The key fields can also be operated in this manner substantially without the apparatus being optically detected by the user. This increases the traffic safety during operation of the apparatus according to the present disclosure. For example, repeated tapping inputs with respect to one of the key fields can be used to change a function associated with the swiping region ("toggling"). Possible functions which can be "connected" by means of the key fields are explained in the further course of the present description. For example, a function selected for the swiping region can also be assigned to the swiping region for future operating steps by means of a long-press gesture. This makes it possible to permanently assign a function desired by the user to the swiping region.

The light outlet may preferably be set up to output a predefined different light color in the region of the key fields irrespective of a current light color in all other regions of the finger strip. A corresponding situation applies to a light intensity. In other words, the regions of the light outlet in the end regions are preferably delimited with respect to the swiping gesture region of the finger strip in an optically impermeable manner. For example, three translucent components of the light outlet may be interrupted by two opaque (that is to say optically "impermeable") structures in the region of the optical and/or haptic delimitation. For example, these optical interruptions may project from a surface of the finger strip in such a manner that they ensure that the end regions are haptically bounded. Optical crosstalk of light is preferably at least avoided by not superimposing translucent elements on the opaque structures in the direction of the user. A particularly homogeneous surface can be achieved, however, by virtue of a completely transparent element forming the surface of the finger strip.

The detection unit may have a linear arrangement of a multiplicity of capacitive antennas which are arranged beside one another in a region behind the finger strip in the main direction of extent (longitudinal direction) of the finger strip. In other words, the individual capacitive antennas follow the linear shape of the finger strip, with the result that a particularly large number of different input positions on the finger strip can be resolved by the detection unit and can be reported to the evaluation unit. In comparison with capacitive surfaces of touch-sensitive screens, the individual capacitive antennas can provide the advantage of more flexible designability with respect to sensitivity and range. For example, the detection unit cannot only detect touch but can also detect when a user approaches without making contact with the finger strip and can report it to the evaluation unit.

For example, the apparatus according to the present disclosure may have a display unit having a touch-sensitive surface and a linear or curved haptic barrier on the display unit. The barrier is used to delimit a display area of the display unit with respect to an edge region of the display unit which is intended for the configuration of a finger strip according to the present disclosure. A segment of the touch-sensitive surface of the display unit which is arranged in the region of the finger strip is therefore used as a detection unit for detecting pressure/tapping and swiping gestures of a user. Accordingly, a segment of the display unit which is arranged in the region of the finger strip can form the light outlet of the apparatus. In other words, the light outlet is in the form of a linear segment of a self-illuminating display unit. As a result of the haptic barrier, the display unit can provide the display area, on the one hand, and the detection unit and the light outlet of the apparatus according to the present disclosure, on the other hand, even though the display unit can be produced as a one-piece element. This increases the stability of the apparatus, reduces the number of components, dispenses with mounting operations and reduces costs of production. Moreover, one-piece components avoid problems of creaking, rattling and unwanted ingress of dirt during vehicle construction, thus preventing malfunctions.

A proximity sensor system may preferably also be provided, the evaluation unit being set up to acknowledge a gesture detected by means of the proximity sensor system by means of a light signal emitted from the light outlet. In other words, not just touch interaction between the user and the finger strip is acknowledged according to the present disclosure, but rather a light signal is already output in response to the user approaching the finger strip in order to inform the user that the possibility of touch input with the apparatus according to the present disclosure exists and what such interaction could look like. This can be effected, for example, by means of light sequences and/or flashing patterns, as a result of which the user is encouraged to input swiping or multi-touch gestures.

The evaluation unit is preferably set up to evaluate a first predefined gesture on the finger strip for adapting a volume of media playback. The first gesture may be, for example, a swiping gesture with a single finger. Alternatively or additionally, the evaluation unit is set up to evaluate a second predefined gesture on the finger strip for adapting a volume of a voice output of the infotainment system. The second gesture may be, for example, a swiping gesture with exactly two fingers (multi-touch gesture). Alternatively or additionally, the evaluation unit may be set up to evaluate a third predefined gesture on the finger strip for adapting a volume of sounds or acoustic warning tones. The third gesture may be, for example, a multi-touch swiping gesture carried out using exactly three fingers. An association between the above-mentioned gestures and exemplary ranges of functions can be modified in any desired manner without departing from the scope of the present disclosure.

Respective advisory text and/or a respective advisory symbol can be output on a display unit of the apparatus depending on the type of gesture or the type of function started by the gesture.

Alternatively or additionally, a light signal output via the light outlet may acknowledge the function and type of detected gesture independently of one another. For example, the type of gesture can be illustrated or acknowledged by one or more positions of increased light intensity. The functions being operated can be illustrated using different colors. For example, if an air-conditioning function is operated by means of a swiping gesture, the light signal can be changed in the direction of blue or in the direction of red depending on a decrease or an increase in a desired temperature. If the function is a change in volume, it is possible to change from a white light in the direction of red light if the volume is increased or, the other way around, from a red light color to white light if the volume is decreased. It goes without saying that light of a first color can be applied to the light outlet approximately completely in order to illustrate how the function is adapted, whereas a second color is selected for light distributed in the region of the user's finger, thus acknowledging the detected gesture (for example irrespective of an adapted function).

The evaluation unit may also be set up, in response to a predefined period elapsing after an end of a gesture detected by means of the detection unit, to adapt a light signal emitted from the light outlet to a current setting of the ambient light of the transportation means. In other words, the light outlet and the luminous means arranged behind the latter can be used to support an ambient light concept if the finger strip according to the present disclosure is acutely not used to receive user gestures or acknowledge them. The predefined period, after which a changeover is automatically made to the ambient light mode after a user interaction, may be, for example, a minimum period in the form of integer multiples of one second in the range between one second and 10 seconds. In this manner, the apparatus according to the present disclosure is used in an even more versatile manner for optically appealing interior design which can be operated intuitively and comfortably.

A second aspect of the present disclosure proposes an infotainment system for a transportation means, which infotainment system comprises an apparatus according to the first-mentioned aspect of the disclosure. In other words, the apparatus according to the present disclosure is supplemented with ranges of functions, for example music playback and/or a navigation function, in one configuration. Accordingly, heating/air-conditioning ranges can also be adapted and illustrated using the apparatus according to the present disclosure. The features, combinations of features and the advantages resulting therefrom correspond to the first-mentioned aspect of the present disclosure, with the result that reference is made to the statements above in order to avoid repetitions.

A third aspect of the present disclosure proposes a transportation means having an infotainment system according to the second-mentioned aspect of the disclosure or an apparatus according to the first-mentioned aspect of the disclosure. The transportation means may be, for example, an automobile, a transporter, a truck, a motorcycle, an aircraft and/or a watercraft. Reference is also made to the statements above with respect to the features, combinations of features and the advantages resulting therefrom of the transportation means according to the disclosure in order to avoid repetitions.

FIG. 1 shows an automobile 10 as a transportation means, sometimes called a transportation vehicle, in which a screen 4 as a display unit is connected to an electronic control unit 5 as an evaluation unit using information technology. A finger strip 1 arranged horizontally below the screen 4 is connected to the electronic control unit 5 using information technology for the purpose of detecting user gestures and for optically acknowledging the latter by means of light signals. A data memory 6 holds predefined references for classifying the user gestures and is used to define light signal patterns associated with the classified user gestures. A user 2 extends his arm substantially horizontally in order to carry out a swiping gesture on the finger strip 1. Without a configuration according to the present disclosure of the finger strip 1, vertical accelerations of the automobile 10 would result in the user occasionally missing the finger strip 1. In addition, the user 2 would have to direct his attention to the finger strip 1 in order to cleanly position his finger on the latter. According to the present disclosure, these operations may be omitted since the finger strip 1 has an advantageous ledge-like structure for guiding the finger of the user 2.

Figure 2:
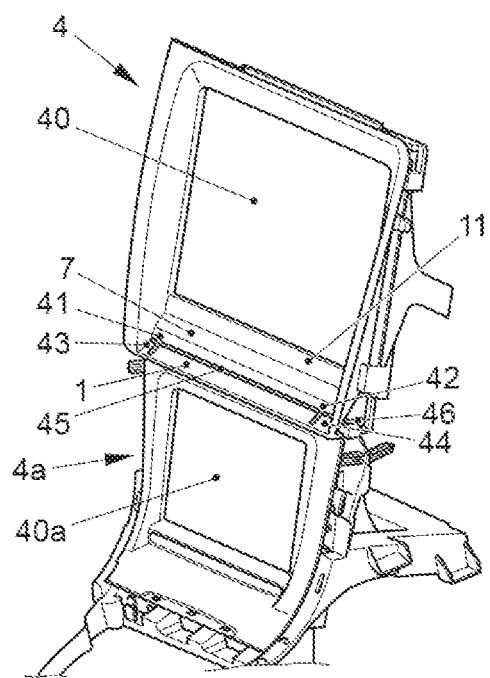
FIG. 2 shows a perspective drawing of an exemplary embodiment of an apparatus.

FIG. 2 shows an exemplary embodiment of an apparatus according to the present disclosure having two screens 4, 4a which are provided substantially above one another for arrangement in a center console or a dashboard of a transportation means. The display areas 40, 40a of the screens 4, 4a are separated, from the top downward in order, by a web-shaped frame part 11 as a haptic barrier, an infrared LED strip 7 as a proximity sensor system and a concave finger strip 1 in which a linear light outlet 45 which follows the longitudinal direction of extent of the finger strip 1 is embedded. Distal regions 43, 44 of the finger strip 1 are delimited or marked with respect to a central swiping gesture region of the finger strip 1 as buttons by means of web structures 41, 42 oriented perpendicular to the longitudinal direction of extent. The linear light outlet 45 is adjoined by a light guide 46 which extends substantially in the direction of travel and conducts light coming from the direction of travel in the direction of the user in order to generate acknowledging light signals.

Figure 3:
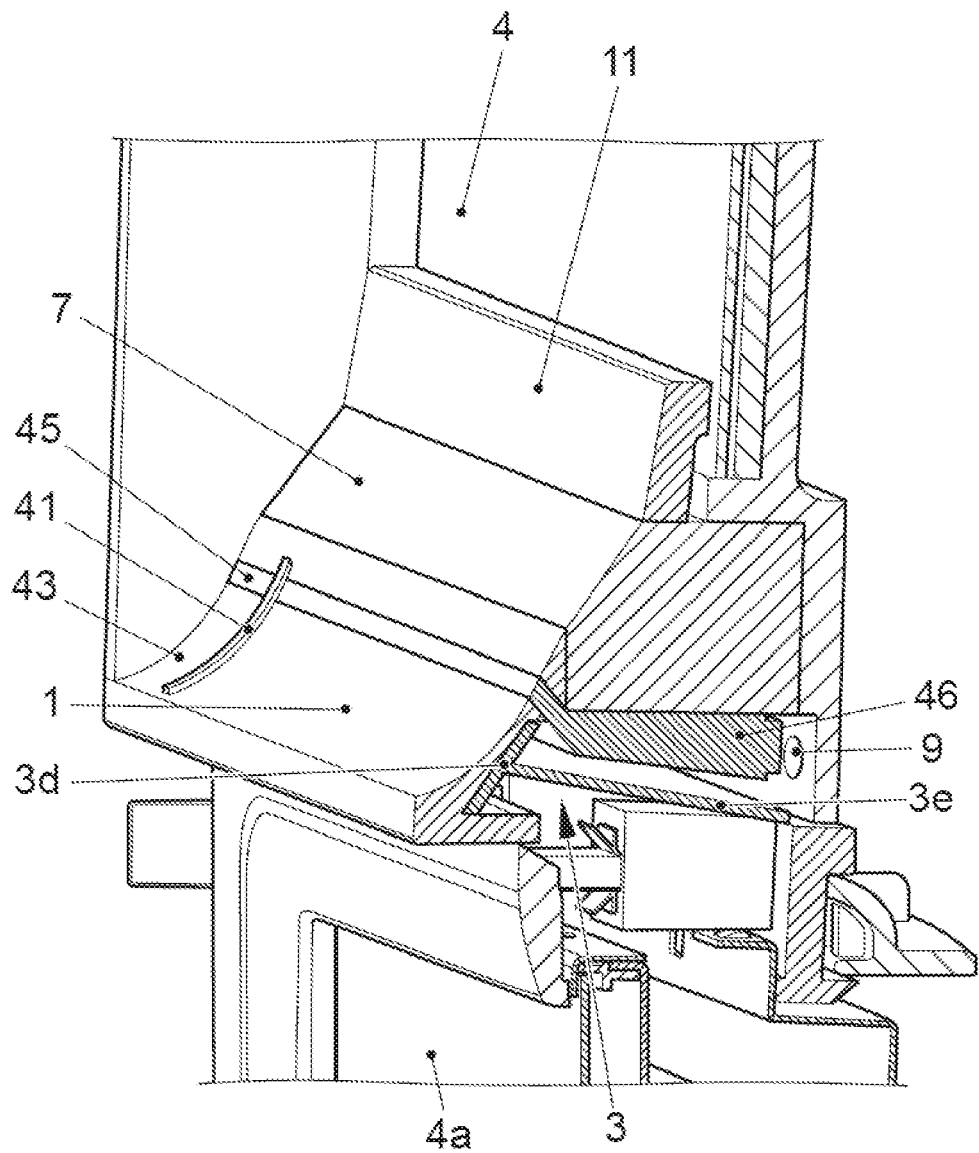
FIG. 3 shows a detailed view of a section of the exemplary embodiment shown in FIG. 2.

FIG. 3 shows a detailed view of the exemplary embodiment of an apparatus according to the present disclosure, as illustrated in FIG. 2. In this view, an LED 9 is provided, by way of example, as a luminous means of a light source on the light guide 46 in the direction of travel, through which LED a narrow but diffusely bounded region of the light exit 45 shines in the light of the LED 9. A carrier 3d of a capacitive detection unit 3 is arranged just below the surface of the finger strip 1 and is mechanically and electrically connected to a circuit board 3e. The circuit board 3e carries electronic components (not illustrated) for operating the detection unit 3.

Figure 4:
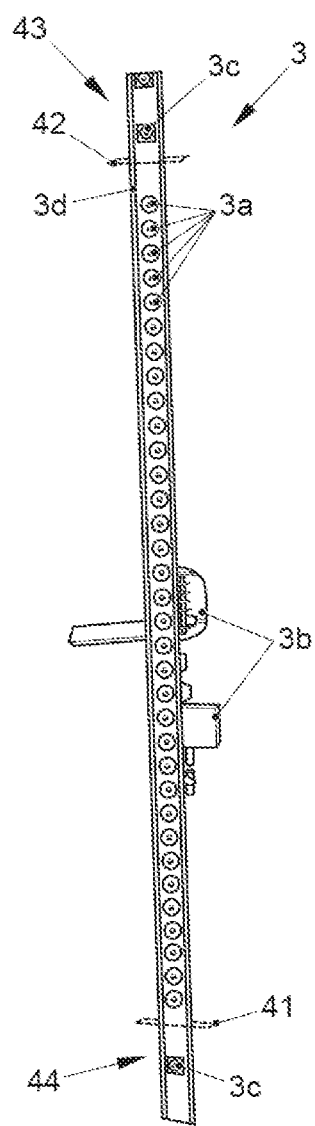
FIG. 4 shows a plan view of an exemplary embodiment of a detection unit which is used according to the disclosure and has a multiplicity of capacitive antennas.

FIG. 4 shows an exemplary embodiment of a detection unit 3, as presented in FIG. 3. In the plan view according to FIG. 4, capacitive antennas 3a which are arranged beside one another in a linear manner can be seen on the carrier 3d, which antennas each have a disk-shaped form and are arranged equidistantly with respect to one another. Webs 41, 42 illustrated using dashed lines are used to indicate end regions 43, 44 each having a square capacitive antenna 3c for receiving pressure and/or tapping and/or long-press gestures. Electronic components 3b are arranged on the circuit board (reference symbol 3e) in FIG. 3 and are provided for the purpose of operating the antennas 3a, 3c.

Figure 5:
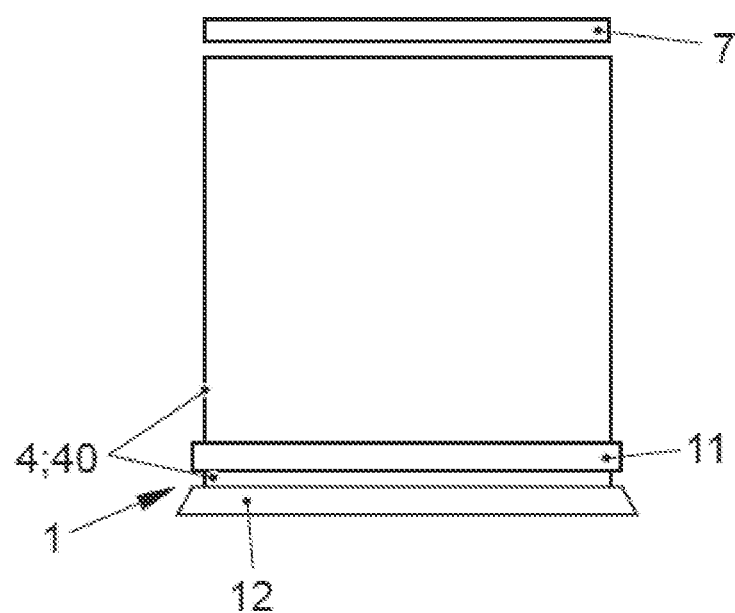
FIG. 5 shows a basic outline illustrating an exemplary embodiment of an apparatus according to the present disclosure, in which a display unit having a touch-sensitive surface provides a display area, a detection unit and a light outlet of an apparatus.

FIG. 5 shows a basic sketch of an alternative exemplary embodiment of an apparatus according to the present disclosure for operating an infotainment system. A proximity sensor system 7 for detecting when a user's hand approaches the apparatus is provided above a screen 4 having a display area 40. A substantially horizontal web 11 on the screen 4 bounds a narrow surface region of the display area 40, which is associated with a finger strip 1 according to the disclosure, from a main display region of the display area 40. The screen 4 is in the form of a touchscreen ("touch-sensitive display unit"), as is known in the prior art. However, in order to implement an apparatus according to the disclosure, a display region 40 arranged above the web 11 is controlled in an entirely different manner to a region which is arranged below the web 11 and forms the detection unit and the light outlet of the apparatus. In other words, a one-piece screen 4 in the form of a touchscreen is provided, the lower edge of which forms the detection unit and the light outlet of the apparatus according to the present disclosure. The finger strip 1 is delimited toward the bottom by a substantially horizontal ledge 12 for placing a finger and guiding it when carrying out a swiping gesture.

Even though the aspects according to the present disclosure and advantageous embodiments have been described in detail on the basis of the exemplary embodiments explained in conjunction with the accompanying figures of the drawing, modifications and combinations of features of the illustrated exemplary embodiments are possible for a person skilled in the art without departing from the scope of the present invention which is defined further in the accompanying clauses.

The present disclosure further relates to a transportation means and a user interface for handling favorites by means of a finger strip in a transportation means. In particular, the present disclosure also relates to different possibilities for defining and selecting favorites by means of a finger strip.

The trend in the interior of transportation means is currently heading to a design without switches. Conventional rotary/pushbutton controllers are also dispensed with in this case. There is nevertheless the need for a suitable input element for inputting continuous values (for example volumes, items in media contents which are played back, heating/air-conditioning operating ranges etc.).

DE 10 2008 046 764 A1 discloses capacitive hardware pushbuttons for storing various functions (also see http://www.bmw.de/de/footer/publications-links/technology-guide/favoritentasten.html). Various pictograms ("icons") or graphics cannot be associated with these hardware pushbuttons. They can only be touched and pressed, whereas other gestures, for example swiping, cannot be resolved as such and therefore are not assigned a predefined function.

An object of the present disclosure is to provide an intuitive and quick possibility for defining and selecting favored ranges of functions ("favorites").

The object identified above is achieved, according to the present disclosure, by means of a transportation means and a user interface. The user interface has an input apparatus for detecting one-dimensional swiping gestures by a user which are guided by means of a structure with respect to two dimensions. The application filed by the applicant at the German Patent and Trademark Office on Dec. 22, 2014 and having the number DE 10 2014226760.9 and the title "Infotainment system, transportation means and apparatus for operating an infotainment system of a transportation means" proposes such an input device which is described above and is referred to as a "finger strip" and can be used as an input device for continuous inputs. The priority of the application DE 10 2014226760.9 is claimed and its contents are integrated in the present description by reference. The input device is likewise referred to as a "finger strip" below since it is intended and set up, in particular, for operation by means of individual fingers for the purpose of adapting continuous-value input variables. The finger strip may have, for example, a longitudinal groove and/or a ledge for supporting a finger during a substantially horizontal swiping gesture. Provision is also made of a display device (for example a screen) which can be designed to display optional contents in the form of a matrix display. Finally, an evaluation unit (for example an electronic control unit comprising a programmable processor, a microcontroller, a nanocontroller or the like) is provided. The evaluation unit is set up to evaluate swiping gestures detected by means of the finger strip for the purpose of adapting an output variable in a substantially infinitely variable manner. The evaluation unit can also evaluate tapping inputs detected by means of the finger strip for the purpose of selecting and/or defining favorites. In other words, provision is made for individual positions (predefined positions and/or positions which can be optionally occupied by the user) on the finger strip to be able to be associated with individual favorites and for a function associated with the favorite to be started using a tapping input with respect to the respective position. In this manner, it is easier to define and select favorites and a finger strip provided in a user interface is provided with an additional range of functions, thus making it possible to dispense with further favorites buttons.

The user interface can preferably have a proximity sensor system which is set up to detect when a user approaches, in response to which the evaluation unit adapts a light color and/or brightness distributed from a light outlet of the finger strip. The light outlet may be part of the finger strip, for example. In particular, the light outlet may have a substantially linear extent along one direction of swiping gestures to be received via the finger strip. Alternatively or additionally, the evaluation unit of the user interface according to the present disclosure is set up to mark predefined segments of the finger strip with respect to functions currently associated with the segments by means of advisory fields displayed on the display device. In other words, the display device can display pictograms and/or text at predefined positions adjacent to the finger strip, which pictograms and/or text are used to mark a respective position on the finger strip as belonging to the function/favorite.

The finger strip may have, at a distal end, a button for receiving tapping gestures, the button being able to be in the form of, in particular, a structure which is lengthened on the far side of a swiping region with the finger strip. The button is set up to emit a changed light color and/or a changed brightness (from the light outlet) in response to an approach detected by means of the detection unit. In other words, the button arranged at at least one distal end is optically highlighted optically with respect to the swiping region and/or other segments of the finger strip in response to a detected approach of a user. This indicates to the applicant that an interaction is associated with the button or a special function (in particular with respect to a swiping gesture carried out in the swiping region) is associated with the buttons.

The button(s) may be set up, in response to a touch gesture detected by means of the detection device, to display, on the display device, a favorites selection field (for example in the form of a window, a button or the like). The favorites selection field may illustrate, for example, favorites predefined for a swiping gesture region of the finger strip. For example, the favorites selection field may indicate a list of the currently defined favorites and/or currently freely configurable (unassigned) favorites positions. Alternatively or additionally, the favorites selection field may be set up to assign favorites to a swiping gesture region of the finger strip. In other words, the favorites selection field may receive user inputs, in response to which a respective favorite is assigned to predefined positions on the finger strip.

A favorite can be allocated to a predefined position on the finger strip, for example, in such a manner that a display and/or operating element displayed on the display unit is shifted to a position inside the favorites selection field by means of a swiping gesture ("drag and drop gesture"). Consequently, a position on the finger strip associated with the position inside the favorites selection field is associated with the display element or a function associated with the display element. As a result, a tapping gesture on the position on the finger strip predefined in this manner can start the associated function. It goes without saying that it is possible to display or predefine different and numerous positions inside the favorites selection field which correspond to a corresponding multiplicity of positions on the finger strip.

The finger strip may also have a light outlet which is set up to optically delimit a position of a favorite by outputting a light color different from other positions on the finger strip. For example, a line light source may be provided in or parallel to the finger strip, which light source emits a first color at the position of a first favorite and a second color at the position of a second favorite. An alternative possibility or an additional possibility for defining/illustrating the positions of assigned and/or assignable favorites involves interrupting a background color predefined for the light outlet by a different light color at least once at a position of a respective favorite. In this manner, the user is advised of the positions at which different favorites are stored or can be stored. It is therefore all the easier and more intuitive to select the positions of favorites.

Through the display device which may be arranged, for example, in the immediate vicinity of the finger strip, predefined segments of the finger strip with respect to functions/favorites currently associated with the segments can be marked by means of a respective advisory field. In other words, pictograms and/or textual components above or below a respective segment of the finger strip can symbolize a function associated with the segment. This may improve the orientation of the user when operating favorites by means of the finger strip.

The evaluation unit is preferably set up, in response to a user input with respect to one of the predefined segments of the finger strip, to start a function associated with the segment. This process can be understood as meaning a call or selection of a favorite. Insofar as the function is directly selected by interacting with the segment of the finger strip, the function can also be interpreted as a "primary function".

This call of a favorite may require an input with a predefined minimum duration ("long-press") in order to cause a shorter tapping gesture only to display the advisory fields displayed on the display device. This enables intuitive assistance for the user and a tidy screen display of the display device in a display mode.

Alternatively or additionally, the display device may be set up, in response to a user input with respect to an advisory field, to display entries associated with the advisory field. The entries may also be understood as meaning context-related information and/or subfunctions or "secondary functions". For example, a function group stored as a favorite within the advisory field may be more finely divided by the associated entries, with the result that even more exact function calls are possible by means of the advisory field. The entries may be displayed in the form of a list and/or in the form of a collection of pictograms (for example within a closed field/window). In this case, each entry or each pictogram constitutes a separate button which starts a respective function call when an associated user interaction is detected.

A second aspect of the present disclosure proposes a transportation means (for example an automobile, a transporter, a truck, a motorcycle, an aircraft and/or a watercraft) having a user interface according to the first-mentioned aspect of the present disclosure. Said user interface may have components which are integrated substantially permanently in the transportation means in a mechanical manner and/or using information technology. The finger strip used makes it possible to reliably guide the finger when defining and/or selecting favored ranges of functions even during a rapid journey over uneven surfaces.

Both aspects of the present disclosure may provide for a tapping input with a predefined minimum duration ("long-press gesture") on the finger strip in order to display the advisory field which is associated with the selected position and has further entries relating to secondary functions with respect to a call of a primary function.

An individual entry within the advisory field which is now displayed can preferably also be selected using a swiping gesture across the finger strip ("scrolling"), in which case lifting of the finger from the finger strip selects or starts the currently selected entry. Alternatively, an additional gesture at any desired position of the finger strip may be needed to select or confirm the entry in the advisory field selected in this manner.

The light outlet of the finger strip proposed or used according to the present disclosure may be intended to be adapted to ambient lighting inside the transportation means with respect to the brightness and the color of the distributed light in a state which is currently not operated.

The possibility of using the finger strip according to the present disclosure can be indicated through the optional proximity sensor system by virtue of an approach illuminating the distal buttons of the finger strip in a color and/or brightness which differs from a color and/or brightness in the swiping region of the finger strip between the distal buttons.

In order to avoid the favorites selection fields for allocating or selecting favorites from becoming too confusing, provision may be made for a first distal button to have a first multiplicity of favorites and for a second button to have a second multiplicity of favorites which are all located at different positions of the finger strip. In other words, a tapping gesture on a left-hand button results in the display of a favorites selection field having entries representing the first half of the available positions of favorites, and a tapping gesture on a right-hand button results in the display of an advisory field comprising the remaining predefined positions of favorites.

Figure 6:
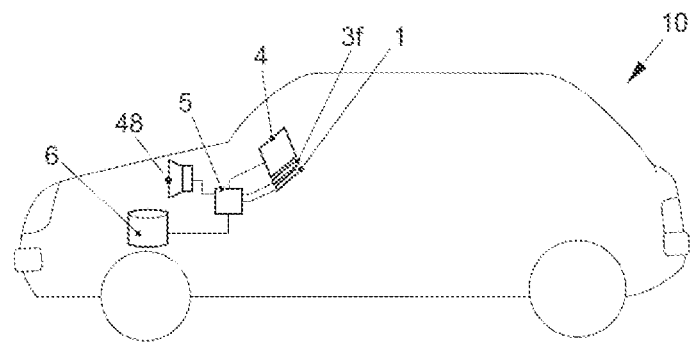
FIG. 6 shows an overview of components of an exemplary embodiment of a transportation means according to the disclosure having an exemplary embodiment of a user interface.

FIG. 6 shows an automobile 10 as a transportation means having an exemplary embodiment of a user interface 47 according to the present disclosure. The user interface 47 comprises a screen 4 which has a touch-sensitive surface and is part of a display device and part of an input device. An infrared LED strip 3f and a finger strip 1 are illustrated below the screen 4 as further parts of the input device. The screen 4 and the infrared LED strip 3f and the finger strip 1 are connected to an electronic control unit 5 as an evaluation unit using information technology. The electronic control unit 5 is also connected to a data memory 6 using information technology, which data memory stores instructions for operating the user interface and references for defining predefined user interactions (for example swiping gestures). Finally, a loudspeaker 48 is also provided for the purpose of outputting advisory and/or acknowledgement tones and for accentuating user inputs and reactions of the user interface 47 to the user inputs.

Figure 7:
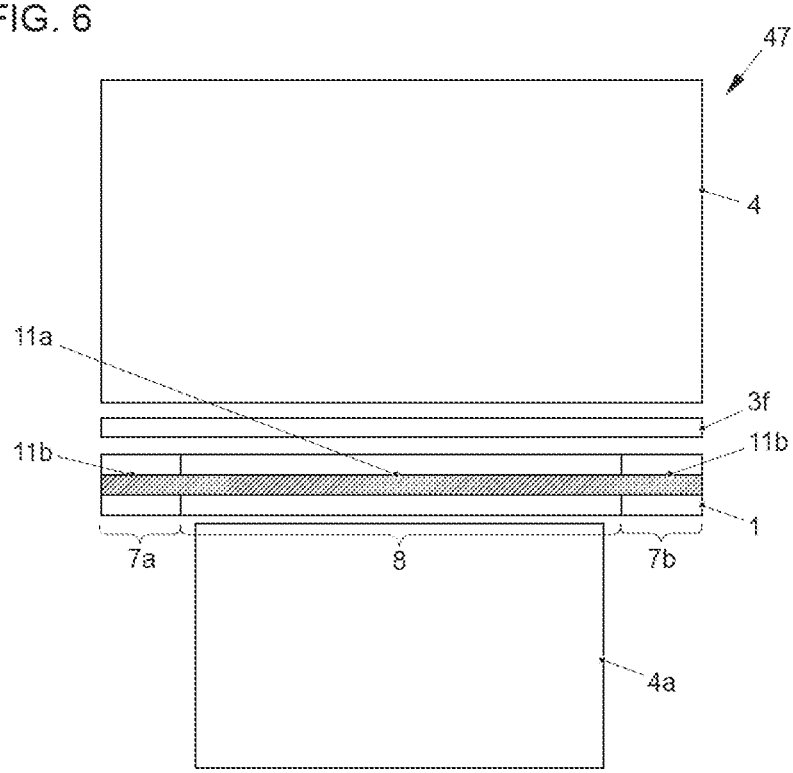
FIG. 7 shows a schematic view of surfaces of an exemplary embodiment of a user interface.

FIG. 7 shows a view of components of a user interface 47, in which a first screen 2 and a second screen 4a are provided for arrangement above one another inside a dashboard of a transportation means. An infrared LED strip 3f is provided between the screens 4, 4a and a finger strip 1 is provided below the infrared LED strip. The finger strip 1 is divided into two distal buttons 7a, 7b which bound a swiping gesture region 8 on both sides. The swiping gesture region 8 has a section 11a of a light outlet which optically merges virtually seamlessly into two sections 11b of the light outlet within the distal buttons 7a, 7b.

Figure 8:
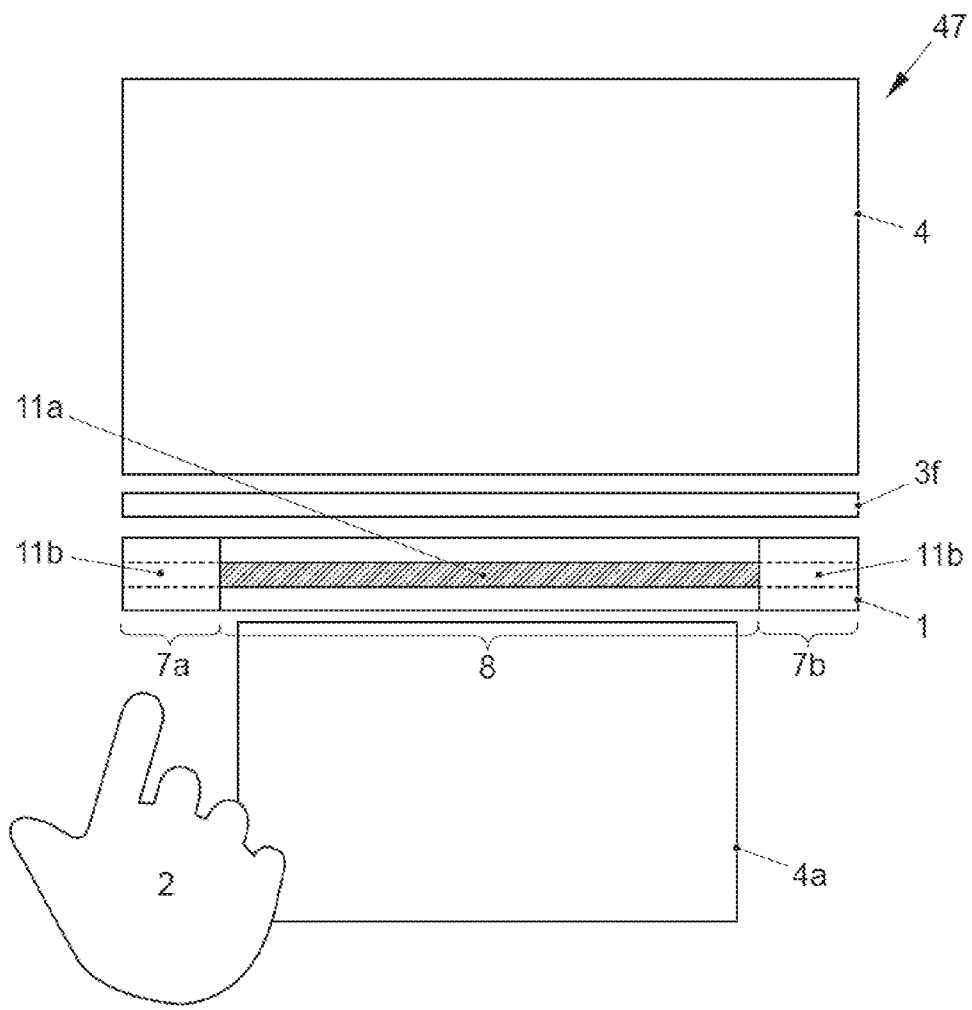
FIG. 8 shows an illustration of a user approaching the exemplary embodiment of the user interface.

FIG. 8 shows the result of a hand of a user 2 approaching the user interface 47, in response to which the sections 11b of the light outlet emit a light color which is changed in comparison with a light color distributed by the swiping gesture region 8. Moreover, the sections 11a, 11 b of the light outlet emit an increased light intensity in response to the detected approach.

Figure 9:
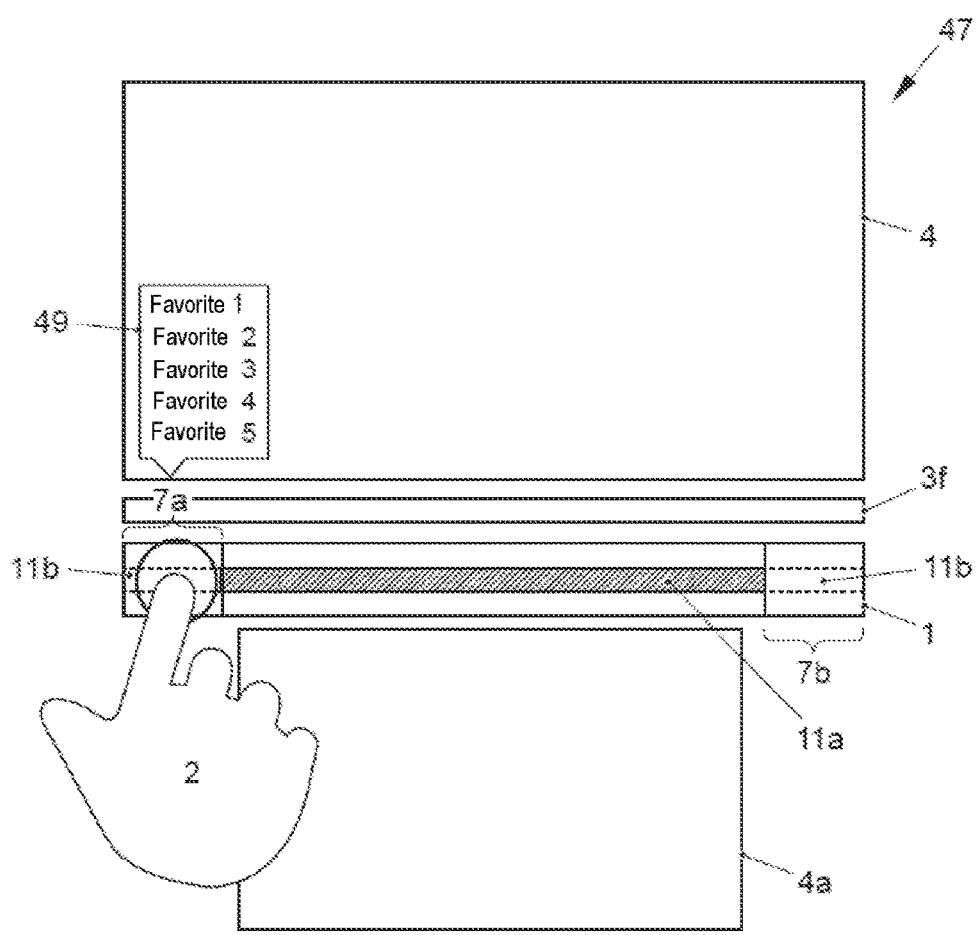
FIG. 9 shows an illustration of the result of a tapping gesture on a left-hand button of the finger strip of the exemplary embodiment of the user interface.

FIG. 9 shows a tapping gesture by a hand of a user 2 on a button 7a arranged to the left of the swiping gesture region 8, in response to which a favorites selection field 49 having five entries representing five different positions of definable favorites on the finger strip 1 is displayed on the screen 4 above the button 7a. The favorites selection field 49 is structured in the form of a list.

Figure 10:
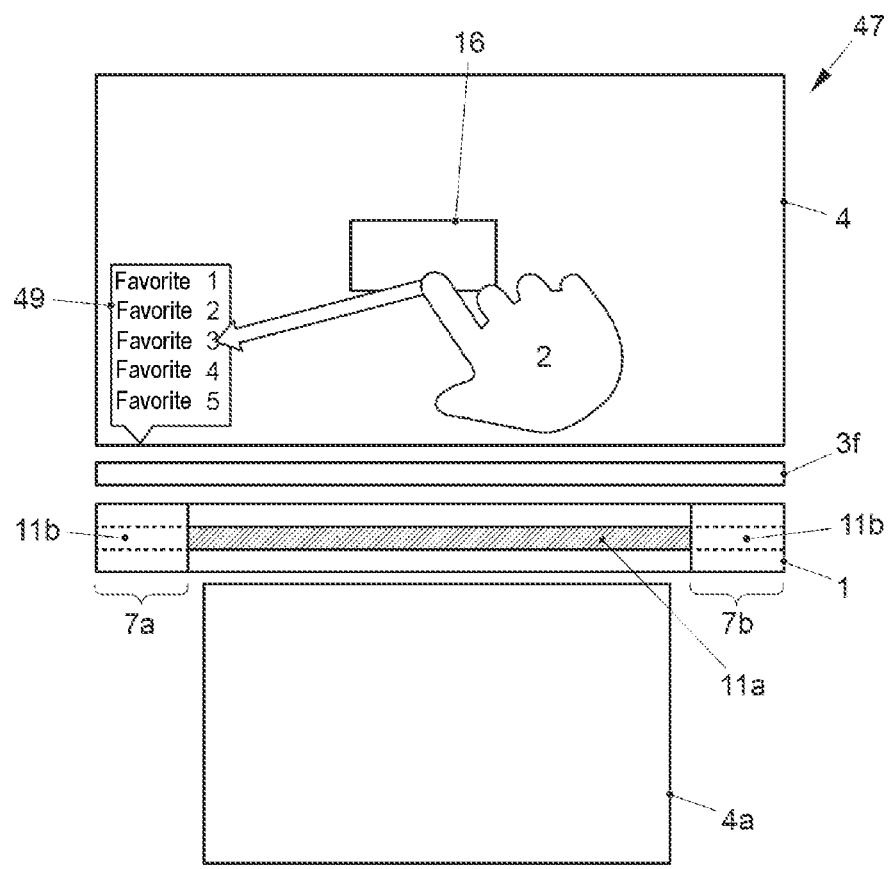
FIG. 10 shows an illustration of a swiping gesture on an advisory field for defining a favorite.

FIG. 10 shows a swiping gesture by the hand of the user 47, which starts on a display element 16, which is likewise displayed on the screen 4, and ends on the entry "favorite 3" in the favorites selection field 49. In this manner, the same function as that which can be started by actuating the display element 16 is associated with that position on the finger strip 1 which is associated with "favorite 3".

Figure 11:
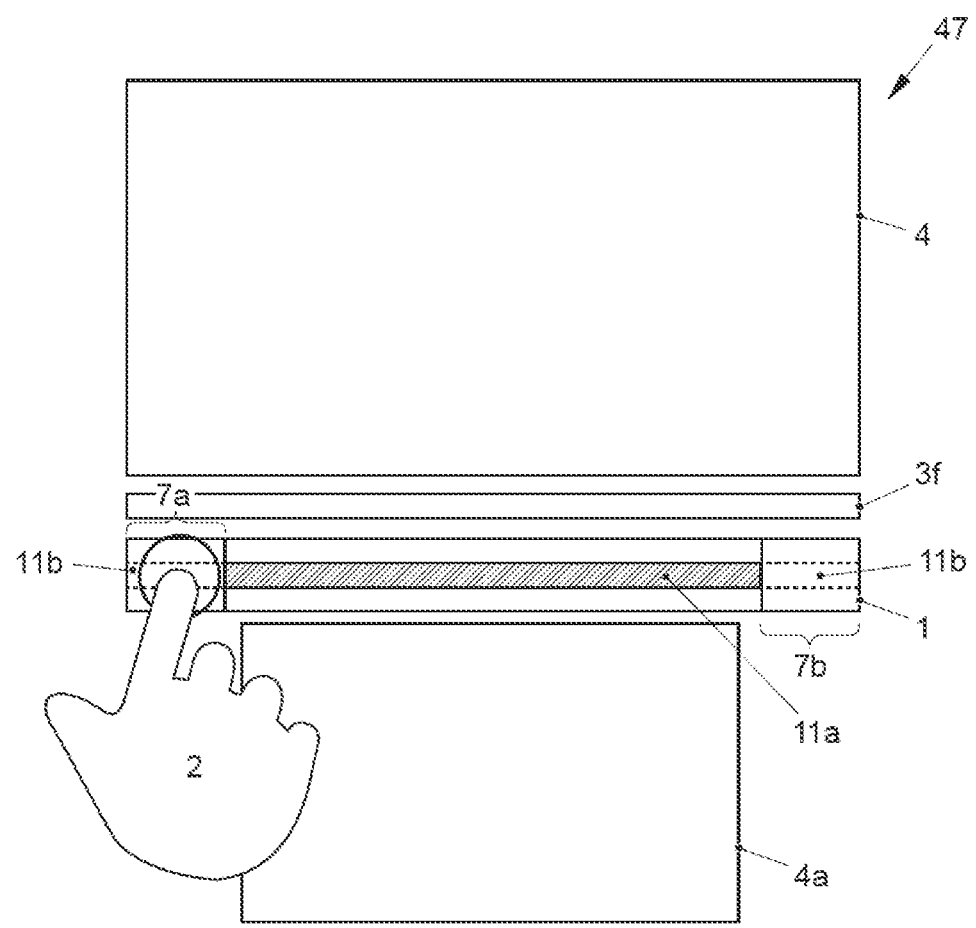
FIG. 11 shows an illustration of a tapping gesture on a button of a finger strip of a second exemplary embodiment of a user interface.

FIG. 11 shows a tapping gesture using the hand of a user 2 on a button 7a to the left of the swiping gesture region 8 of the finger strip 1 of a second exemplary embodiment of a user interface 47, the features of which are explained in connection with the following figures.

Figure 12:
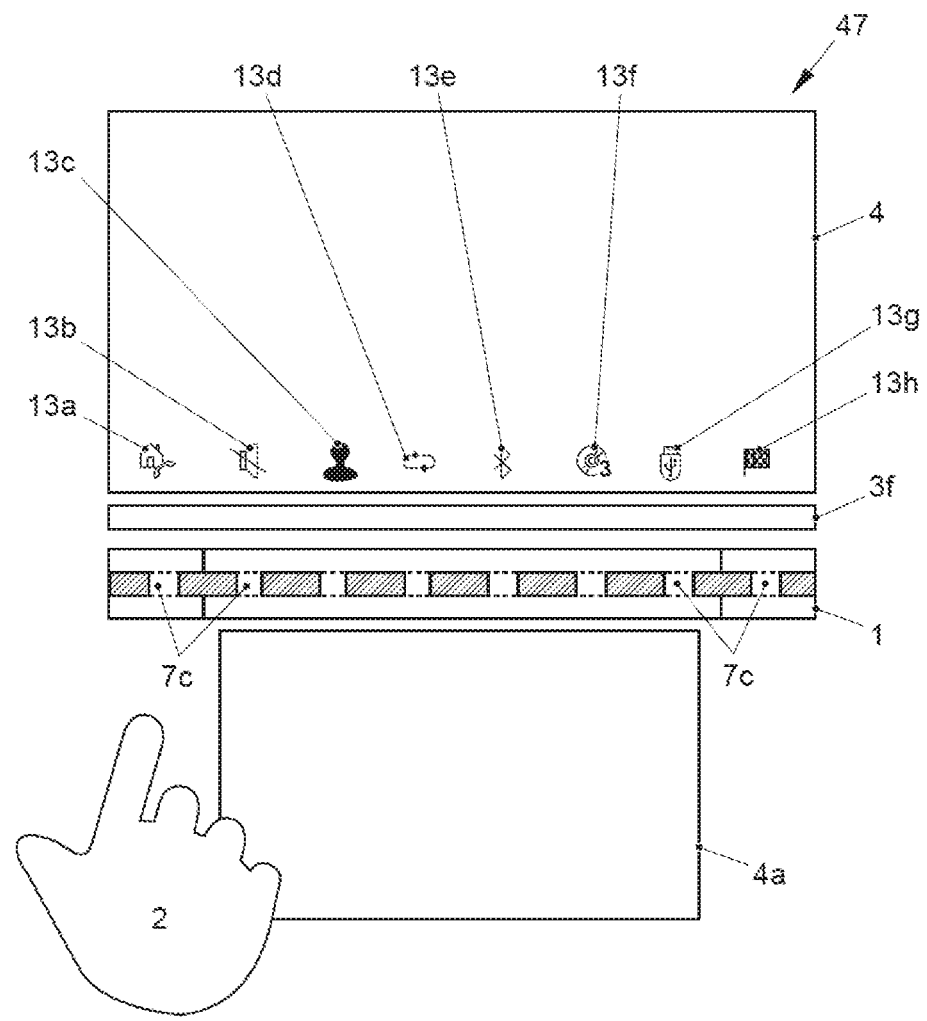
FIG. 12 shows an illustration of the result of the gesture illustrated in FIG. 11.

FIG. 12 shows the result of the tapping gesture illustrated in FIG. 11. Individual positions 7c are now marked on the finger strip 1 by distributing a changed light color from the light outlet of the finger strip 1. Above the positions 7c, the screen 4 shows pictograms 13a to 13h which illustrate the contents of the function calls associated with the positions 7c. The pictogram 13a illustrates the calling of a predefined number. The pictogram 13b illustrates an audio mute function. The pictogram 13c illustrates the calling of a predefined address book entry in the form of associated telephone numbers. The pictogram 13d illustrates repeated playback of media contents. The pictogram 13e illustrates ranges of functions of a Bluetooth connection. The pictogram 13f illustrates a playback function for a data storage medium on the optical drive. The pictogram 13g illustrates ranges of functions associated with a USB data memory. The pictogram 13h illustrates ranges of functions associated with a navigation function.

Figure 13:
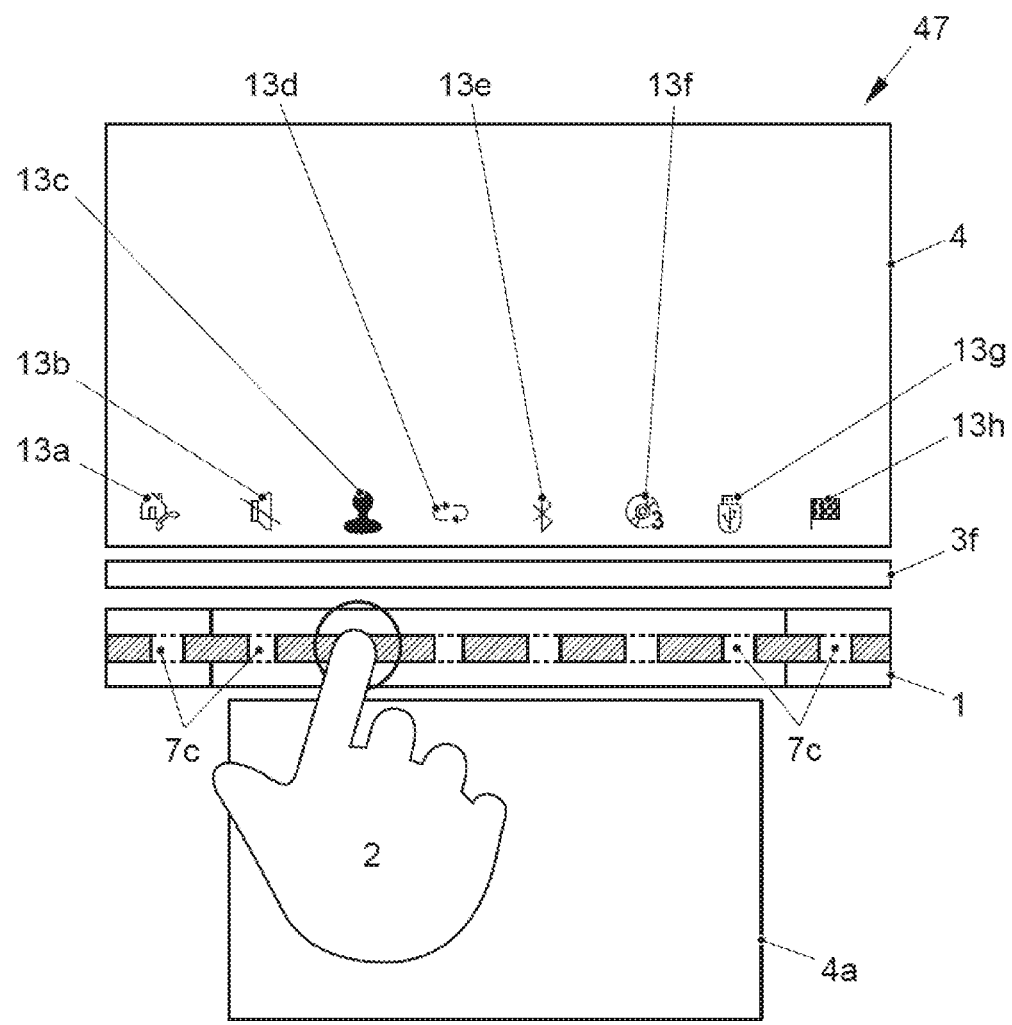
FIG. 13 shows an illustration of a tapping gesture by a user at a position which is assigned a favorite on a finger strip of the second exemplary embodiment.

FIG. 13 shows a tapping gesture by a user on a position 7c on the finger strip 1 which is associated with the pictogram 13c and therefore the favored entry of the address book. In response to this, a predefined telephone number of the address book entry is dialed.

Figure 14:
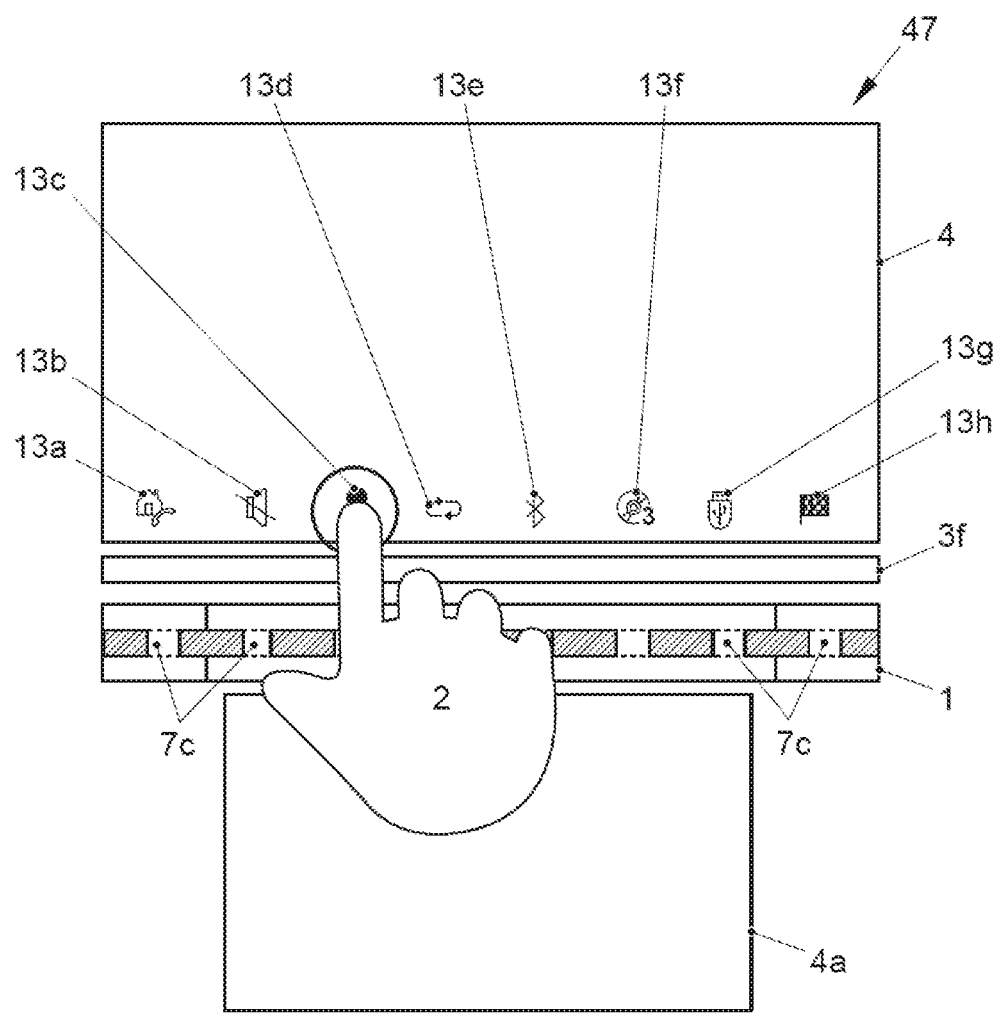
FIG. 14 shows an illustration of a tapping gesture by a user on an advisory field associated with the favorite selected in FIG. 13.

FIG. 14 shows a tapping gesture by a user on the pictogram 13c illustrated in the screen 4. This input is detected by means of a touch-sensitive surface of the screen 4.

Figure 15:
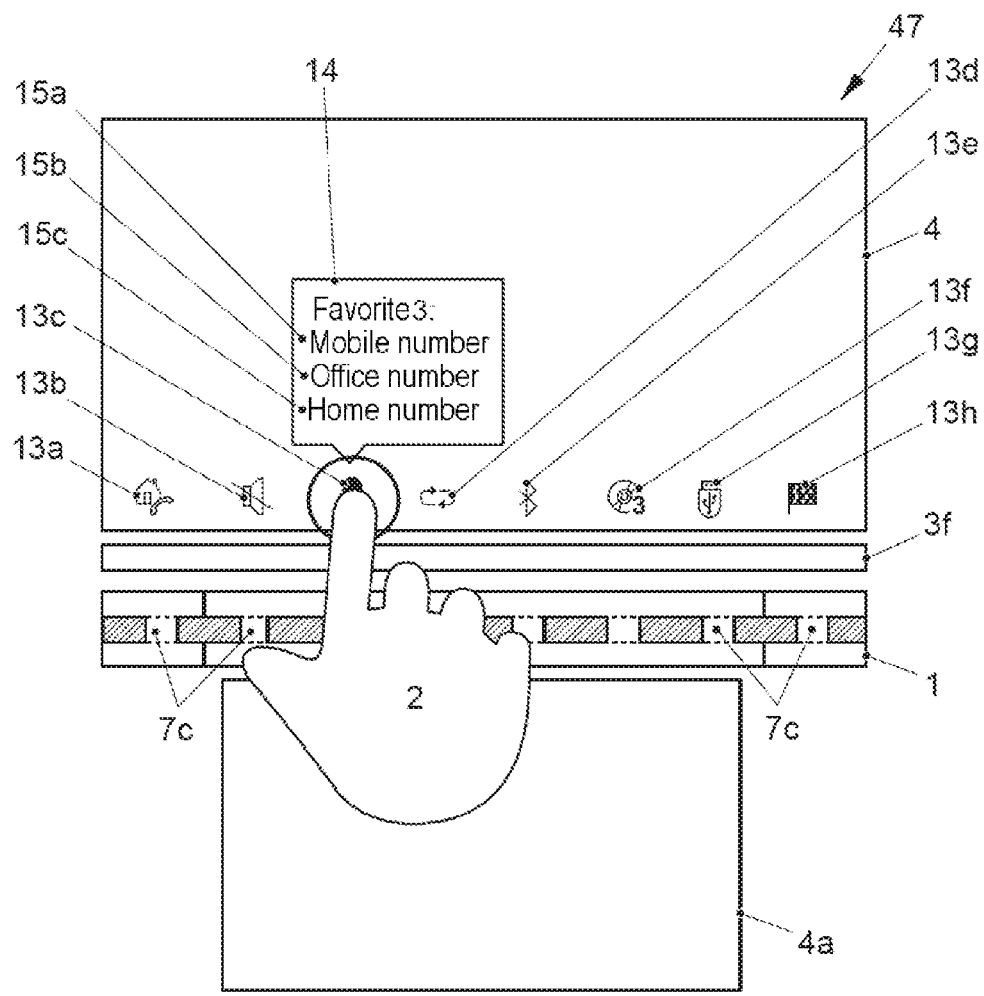
FIG. 15 shows an illustration of a secondary function list which is displayed in response to the tapping gesture illustrated in FIG. 14 and comprises entries representing secondary functions.

FIG. 15 shows the illustration of a secondary function list 14 which, in response to the tapping gesture with respect to the pictogram 13c, contains additional details or secondary functions relating to "favorite 3". The entry 15a is a mobile number of the contact. The entry 15b is an office number of the contact. The entry 15c is a home number of the contact.

Figure 16:
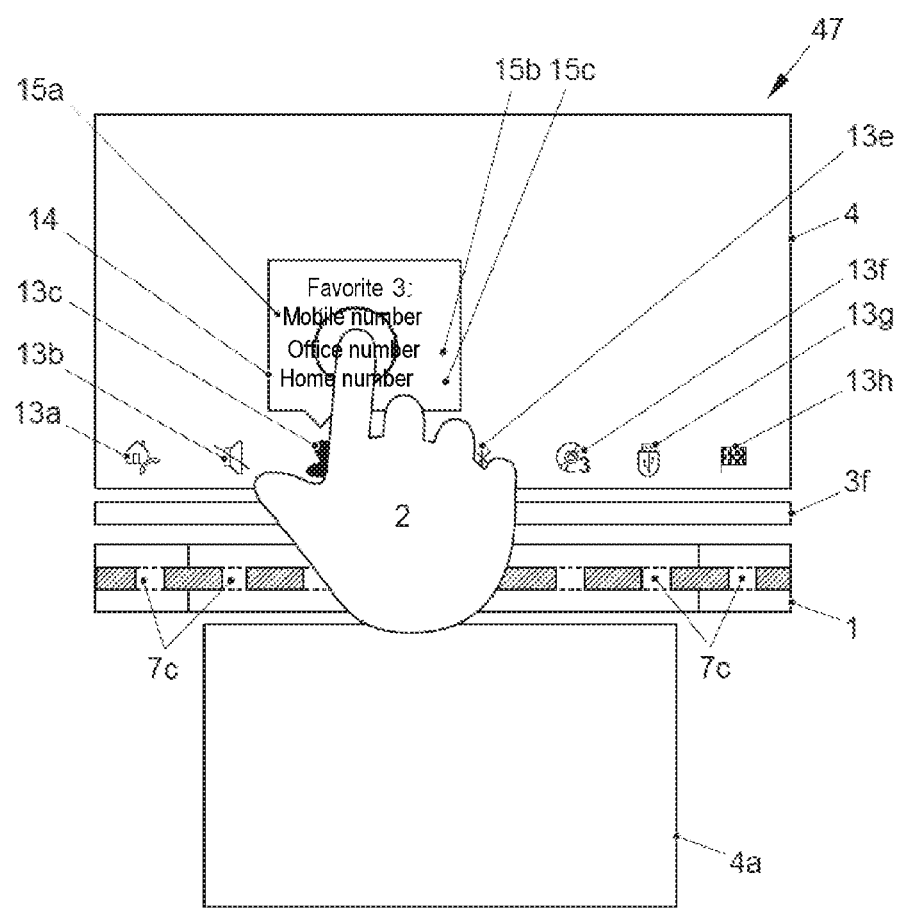
FIG. 16 shows an illustration of a tapping gesture by a user on an entry in the secondary function list.

FIG. 16 shows a tapping gesture on the entry 15b within the secondary function list 14, in response to which the office number of the contact is selected.

The trend in the cockpits of current transportation means, in particular motor vehicles, is currently heading to a design without switches. Since the intention is also to dispense with conventional rotary/pushbutton controllers in this case, as a result of which no significant haptic feedback follows user inputs, there is the need for a user interface and an input element which is integrated well in the optics of a cockpit without switches and nevertheless provides the customer with good orientation and optical feedback when adjusting important functions (for example audio volume, scrolling in long lists, climate control, etc.).

DE 10 2012 008 681 A1 discloses a multi-function operating device for a motor vehicle, in which a combined slider/touch surface is provided for the purpose of receiving swiping gestures and pressure inputs. The operating element is elongated or rectangular, a raised edge projection being used to guide the user's finger. The operating element is preferably arranged substantially vertically on the side of the screen display.

DE 10 2013 000 110 A1 discloses an operating method and an operating system in a vehicle, in which, in response to a touch-sensitive surface on a second display area being touched, buttons displayed on a first display area are changed in such a manner that additional information belonging to the button is displayed on the first display area. For this purpose, a touch-sensitive surface is provided for capacitive interaction with an actuation object (for example a capacitive touchscreen).

DE 10 2008 048 825 A1 discloses a display and operating system in a motor vehicle having user-adaptive display, a user input being able to be used to activate a modification mode in which all display objects are at least partially graphically displayed in a section of the display area. In this manner, objects previously distributed over an entire display area can be displayed in such a section which is within reach of a user.

Even though embodiments have been described in detail on the basis of the exemplary embodiments explained in conjunction with the accompanying figures of the drawing, modifications and combinations of features of the illustrated exemplary embodiments are possible for a person skilled in the art without departing from the scope of the present disclosure, the scope of protection of which is defined by the accompanying claims.

LIST OF REFERENCE SYMBOLS

1 Finger strip
2 User
3 Detection unit
3a Capacitive antennas
3b Electronic components
3c Capacitive antennas (touching region)
3d Carrier
3e Circuit board of the detection unit
3f Infrared LED strip
4, 4a Screen
5 Electronic control unit
6 Data memory
7 Proximity sensor system
7a, 7b Buttons of the finger strip
7c Positions
8 Swiping gesture region of the finger strip
9 LED
10 Automobile
11 Web/frame part
11a, 11b Segments of the light outlet
12 Ledge
13a to 13h Pictograms
14 Secondary function list
15a to 15c Entries in the secondary function list 14
16 Display element
40, 4a Display area
41, 42 Haptic limits
43, 44 End regions
45 Light outlet
46 Light guide
47 User interface
48 Loudspeaker
49 Favorites selection field

The invention claimed is:

1. A user interface comprising
an input device for detecting swiping gestures by a user which are guided by a structure with respect to two dimensions provided by a finger strip,
a display device, and
an evaluation unit,
the evaluation unit being set up
to evaluate swiping gestures detected by the finger strip in order to adapt an output variable in a substantially infinitely variable manner,
to evaluate tapping inputs detected by the finger strip for the purpose of defining favorites, and
to selectively associate the favorites with predefined segments of the finger strip such that the user is able to choose which favorite is currently associated with each predefined segment, wherein the finger strip is arranged fixedly in an edge region outside of the display device.

2. The user interface of claim 1, also comprising
a proximity sensor system which is set up
to detect when a user approaches, and
the evaluation unit being set up, in response to a detected approach,
to cause a light outlet of the finger strip to distribute at least one of a changed light color and brightness, and/or
to mark predefined segments of the finger strip with respect to the favorites currently associated with the predefined segments by means of advisory fields displayed on the display device.

3. The user interface of claim 2, the finger strip having, at a distal end, a button configured to receive tapping gestures, which button is set up to emit at least one of a changed light color and a changed brightness in response to an approach detected by means of the detection unit.

4. The user interface of claim 1, wherein the button is set up, in response to a touch gesture detected by the detection unit, to display, on the display device, a favorites selection field configured to
mark favorites defined for a swiping gesture region of the finger strip or
assign favorites to the swiping gesture region of the finger strip.

5. The user interface of claim 4, wherein
the evaluation unit is set up, in response to the detection of a swiping gesture which starts on a display element displayed on the display device and ends on the favorites selection field, to assign a favorite associated with the display element to the finger strip.

6. The user interface of claim 4, wherein the favorites selection field indicates a multiplicity of different favorites positions arranged on the finger strip.

7. The user interface of claim 1, wherein the finger strip has a light outlet which is set up to optically delimit a position of a favorite from other positions on the finger strip by outputting a predefined light color.

8. The user interface of claim 1, wherein the display device is set up to mark predefined segments of the finger strip with respect to at least one of functions and favorites currently associated with the segments by means of an advisory field.

9. The user interface of claim 8, wherein the evaluation unit is set up, in response to a user input with respect to one of the predefined segments of the finger strip, to start a function associated with the segment.

10. The user interface of claim 9, wherein the display device is set up, in response to a user input with respect to an advisory field, to display entries associated with the advisory field in a secondary function list.

11. The user interface of claim 10, wherein the evaluation unit is set up, in response to a user input with respect to an entry in the secondary function list, to start a function associated with the entry.

12. The user interface of claim 1, wherein the edge region is located above or below the display device.

13. The user interface of claim 12, wherein the predefined segments of the finger strip are aligned with icons displayed on the display screen.

14. The user interface of claim 13, wherein the predefined segments of the finger strip are aligned vertically with the icons displayed on the display screen and the icons are associated with the indicative of the favorites.

15. The user interface of claim 1, wherein the predefined segments of the finger strip are arranged vertically below icons displayed on the display screen.

16. The user interface of claim 15, wherein the predefined segments of the finger strip are aligned vertically with the icons displayed on the display screen.

17. A transportation vehicle comprising a user interface that includes
- an input device for detecting swiping gestures by a user which are guided by a structure with respect to two dimensions provided by a finger strip,
- a display device, and
- an evaluation unit, the evaluation unit being set up to evaluate swiping gestures detected by the finger strip in order to adapt an output variable in a substantially infinitely variable manner, and to evaluate tapping inputs detected by means of the finger strip for the purpose of defining favorites, and to selectively associate the favorites with individual positions of the finger strip.

18. The user interface of claim 17, wherein the finger strip is fixed in location relative to the display device and the individual positions of the finger strip are aligned with icons displayed on the display device.

19. A user interface comprising
- a finger strip configured to detect one-dimensional swiping gestures and tapping inputs by a user of the user interface in a substantially infinitely variable manner,
- a display device,
- a light outlet configured to distribute at least one of a changed light color and brightness,
- a proximity sensor system configured to detect when a user approaches the user interface, and
- a controller configured to evaluate the swiping gestures detected by the finger strip, to evaluate the tapping inputs detected by the finger strip, to mark predefined segments of the finger strip with respect to functions associated with the predefined segments by means of at least one of the display device and the light outlet in response to a detected approach of the user by the proximity sensor system, and to selectively associate the favorites with the predefined segments of the finger strip based on user input,
- wherein the controller is configured to cause the light outlet to produce a shimmer around a finger(s) of the user and to move the shimmer with the finger(s) during a swiping gesture by the user on the finger strip.

20. The user interface of claim 19, wherein the finger strip is fixed in location relative to the display device and the predefined segments of the finger strip are aligned vertically with icons displayed on the display screen.

* * * * *